US012681497B2

(12) United States Patent
Itozawa et al.

(10) Patent No.: US 12,681,497 B2
(45) Date of Patent: Jul. 14, 2026

(54) DELIVERY SYSTEM, DELIVERY METHOD, NON-TRANSITORY COMPUTER READABLE MEDIUM

(71) Applicant: TOYOTA JIDOSHA KABUSHIKI KAISHA, Aichi-ken (JP)

(72) Inventors: Yuta Itozawa, Nagoya (JP); Takashi Izumi, Tokyo-to (JP); Tatsuya Tsubakimoto, Tokyo-to (JP); Uori Koike, Saitama (JP); Satoshi Komamine, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 94 days.

(21) Appl. No.: 18/628,807

(22) Filed: Apr. 8, 2024

(65) Prior Publication Data

US 2024/0353858 A1 Oct. 24, 2024

(30) Foreign Application Priority Data

Apr. 18, 2023 (JP) ................................. 2023-067819

(51) Int. Cl.
G05D 1/622 (2024.01)
G05D 1/667 (2024.01)
G05D 105/28 (2024.01)

(52) U.S. Cl.
CPC ............. G05D 1/622 (2024.01); G05D 1/667 (2024.01); G05D 2105/28 (2024.01)

(58) Field of Classification Search
CPC ..... G05D 1/622; G05D 1/667; G05D 2105/28
See application file for complete search history.

(56) References Cited

U.S. PATENT DOCUMENTS

2022/0105854 A1 4/2022 Matsushita et al.

FOREIGN PATENT DOCUMENTS

| | | | | |
|---|---|---|---|---|
| JP | H06144506 A | * | 5/1994 | |
| JP | 2011-105469 A | | 6/2011 | |
| JP | 2020113108 A | * | 7/2020 | ........... G05D 1/2427 |
| JP | 2021073730 A | * | 5/2021 | |
| JP | 2022-061816 A | | 4/2022 | |
| JP | 2022-181531 A | | 12/2022 | |
| WO | 2020/039508 A1 | | 2/2020 | |

OTHER PUBLICATIONS

JP2020113108A translation (Year: 1992).*
JP2021073730A translation (Year: 2021).*
JPH06144506A translation (Year: 2019).*

* cited by examiner

*Primary Examiner* — Hitesh Patel
*Assistant Examiner* — Joshua Jeffrey Penko
(74) *Attorney, Agent, or Firm* — HAUPTMAN HAM, LLP

(57) ABSTRACT

A delivery system includes a storage shelf, a delivery robot capable of moving to the storage shelf and delivering an article to the storage shelf, a detection unit that detects an obstacle present near the storage shelf, and a control unit that controls an operation of the delivery robot. The control unit is configured to, when the detection unit detects an obstacle present in a predetermined area near the storage shelf and the control unit determines that the delivery robot can deliver an article to the storage shelf, determine a stop position and a stop direction of the delivery robot relative to the storage shelf based on a position of the detected obstacle and a position of the storage shelf.

11 Claims, 10 Drawing Sheets

1

DELIVERY SYSTEM, DELIVERY METHOD, NON-TRANSITORY COMPUTER READABLE MEDIUM

CROSS REFERENCE TO RELATED APPLICATIONS

This application is based upon and claims the benefit of priority from Japanese patent application No. 2023-067819, filed on Apr. 18, 2023, the disclosure of which is incorporated herein in its entirety by reference.

BACKGROUND

The present disclosure relates to a delivery system, a delivery method, and a program.

Japanese Unexamined Patent Application Publication No. 2022-061816 discloses a technology in which when a vehicle, such as an automated guided vehicle (AGV), delivers a package to a locker of an end user, the vehicle stores the package in the locker.

SUMMARY

When a delivery robot stores an article in a storage shelf, the delivery robot needs to stop in a predetermined area near the storage shelf. However, when an obstacle is present in the predetermined area near the storage shelf, the delivery robot may not be able to determine an appropriate stop position in the predetermined area near the storage shelf. Therefore, the delivery robot cannot execute an operation for storing the article in the storage shelf.

The present disclosure has been made in view of the above-described problem and provides a delivery system capable of delivering an article to a storage shelf and storing it in the storage shelf as much as possible without having to remove an obstacle present in a predetermined area in front of the storage shelf.

A delivery system according to one aspect of the present disclosure includes:

a storage shelf;

a delivery robot capable of moving to the storage shelf and delivering an article to the storage shelf;

a detection unit configured to detect an obstacle present near the storage shelf; and a control unit configured to control an operation of the delivery robot, in which the control unit is configured to, when the detection unit detects an obstacle present in a predetermined area near the storage shelf and the control unit determines that the delivery robot is able to deliver an article to the storage shelf, determine a stop position and a stop direction of the delivery robot relative to the storage shelf based on a position of the detected obstacle and a position of the storage shelf, and then stop the delivery robot at the determined stop position in the determined stop direction to store the article in the storage shelf.

A delivery method according to one aspect of the present disclosure includes, when a detection unit detects an obstacle present in a predetermined area near a storage shelf and it is determined that a delivery robot is able to deliver an article to the storage shelf, determining a stop position and a stop direction of the delivery robot relative to the storage shelf based on a position of the detected obstacle and a position of the storage shelf, and then stopping the delivery robot at the determined stop position in the determined stop direction to store the article in the storage shelf.

A program according to one aspect of the present disclosure causes a computer to, when a detection unit detects an obstacle present in a predetermined area near a storage shelf and it is determined that a delivery robot is able to deliver an article to the storage shelf, determine a stop position and a stop direction of the delivery robot relative to the storage shelf based on a position of the detected obstacle and a position of the storage shelf, and then stop the delivery robot at the determined stop position in the determined stop direction to store the article in the storage shelf.

According to the present disclosure, it is possible to provide a delivery system and the like capable of delivering an article to a storage shelf and storing it in the storage shelf as much as possible without having to remove an obstacle present in a predetermined area in front of the storage shelf.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the following embodiments. Further, for the clarification of the description, the following descriptions and the drawings are simplified as appropriate.

First Embodiment

A delivery system according to a first embodiment will be described below with reference to the drawings.

Figure 1:
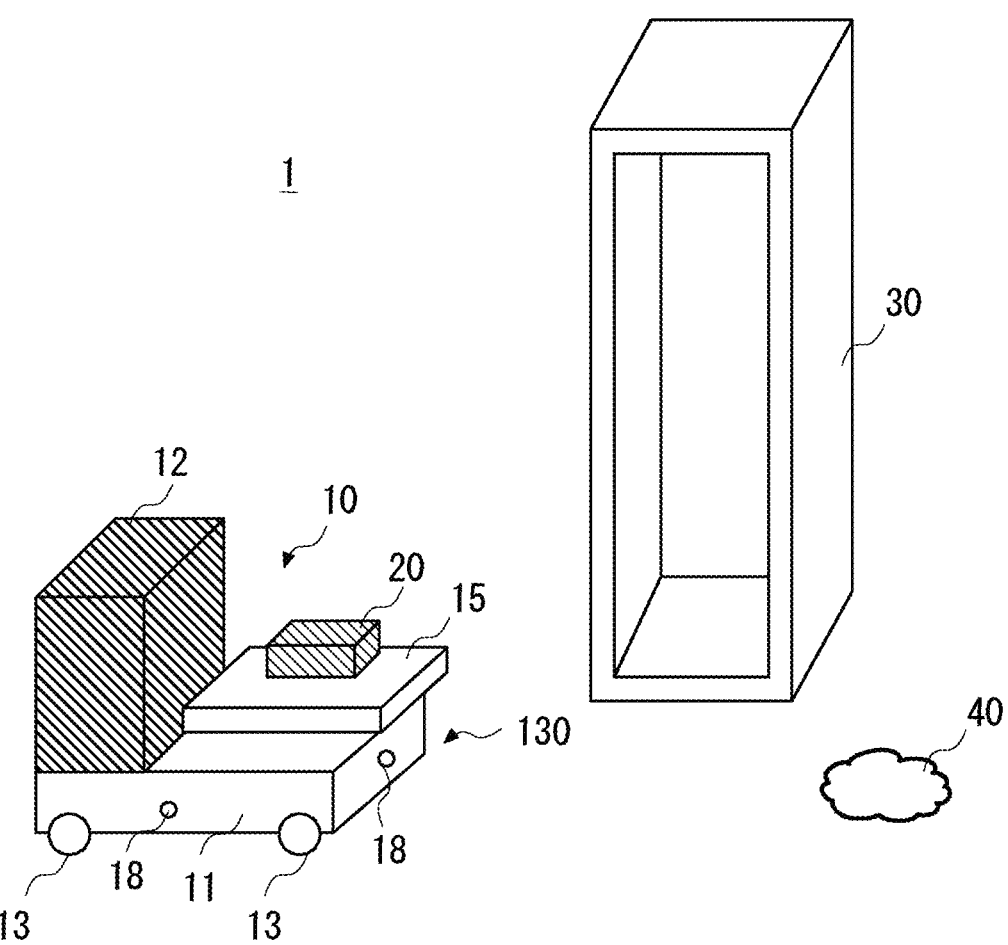
FIG. 1 is a schematic perspective view for explaining a delivery system according to a first embodiment.

FIG. 1 is a schematic perspective view for explaining an outline of a delivery system 1. The delivery system 1 can be used for a last one mile in logistics, that is, a logistics service from a final base to an end user. The delivery system 1 includes a delivery robot 10 and a storage shelf 30. The storage shelf 30, which is also referred to as a smart post, allows a delivery robot to complete delivery without having to hand an article to an end user. For example, the storage shelf is installed in each room of an apartment building where end users live. A resident (an end user) can access an article stored in the storage shelf from inside the room, and take an article out of the storage shelf or put an article into the storage shelf.

The delivery robot 10 moves to a plurality of storage shelves 30 disposed at various places, stops in front of each of the storage shelves 30, and stores an article 20 in each of the storage shelves 30. This operation can also be referred to as delivery. Further, the delivery robot 10 moves to a plurality of storage shelves 30 disposed at various places, stops in front of each of the storage shelves 30, and takes the article 20 out of the storage shelf 30, and conveys the article 20 taken out. This operation can also be referred to as a pickup. The delivery robot 10 (or the storage shelf 30) includes a mechanism for delivering articles to and from the storage shelf 30. The delivery robot 10 also includes various types of sensors, and it can detect storage shelves, roads, and obstacles, and move autonomously. A known object recognition technique can be used. The present disclosure proposes a delivery system and a delivery method capable of performing delivery as much as possible even when an obstacle is present near a storage shelf.

The storage shelf 30 may include a plurality of shelves (not shown) capable of housing articles. The storage shelf 30, for example, is disposed in front of each room of a building or an apartment building, and includes a door (not shown) on the front surface thereof. The door can be opened automatically when the delivery robot 10 stops in front of the storage shelf 30. The door may be, for example, a horizontally openable shutter, a vertically openable shutter, a single swing door, or a double swing door.

The delivery robot 10 includes a base part 11 including a plurality of wheels 13 (may be collectively referred to as a carriage part 130), a storage part 12 provided on the base part 11 and in which a large number of articles 20 can be stored, and a mounting table 15 which is provided on the base part 11 and on which each of the articles 20 is mounted. The base part 11 may be a substantially rectangular elongated plate-like member. Further, one or more sensors 18 that detect or capture an image of an object or the like present in all directions of the delivery robot and detect a position of an obstacle on a road, a position of a storage shelf, or the like are provided at any place in the delivery robot 10 (the base part 11 in this example). The sensor 18 may be, for example, a camera. In some embodiments, for example, a traveling robot 60 (see FIG. 8) including a sensor (e.g., a sensor 18 such as a camera) that travels through an apartment building or another delivery robot including a sensor that performs another delivery may be provided separately from the delivery robot 10. The traveling robot 60 may, for example, move through a passage in an apartment building and monitor whether or not obstacles are present on the passage. The traveling robot 60 can communicate monitoring information to the delivery robot through a wireless network. In another embodiment, a fixed monitoring camera 70 (a sensor 18) (see FIG. 8) installed near the storage shelf 30 (e.g., the ceiling of a passage in an apartment building) may be provided.

The mounting table 15 includes a mechanism for mounting one article 20 taken out of the storage part 12 and storing this article 20 on one desired shelf of the storage shelf 30. Further, the mounting table 15 can be moved up and down along a vertical direction, and includes an extendable arm (not shown) which can be extended and contracted on a horizontal direction axis, and the extendable arm is configured so as to be movable in the front-rear and right-left directions. In some embodiments, the mounting table 15 may be configured so as to be rotatable about a vertical axis. The mounting table 15 may also be configured so as to be movable in all directions (360°) in a state in which an article is mounted thereon. However, as shown in FIG. 1, since the storage part 12 is disposed on one side of the base part 11, the mounting table 15 cannot be moved in a certain direction of the storage part 12 (also referred to as a rear side in this specification). Note that the delivery robot 30 is used to deliver articles to and from the storage shelf 30, and does not include a mechanism for removing obstacles.

Note that the delivery system 1 may include a management server (not shown) that controls the travelling of the delivery robot 10. In this case, the management server includes a control unit 100 connected to the delivery robot through a network. Further, in another embodiment, the control unit of the management server and the control unit of the delivery robot can achieve the present disclosure by distributing the functions thereof.

Figure 2:
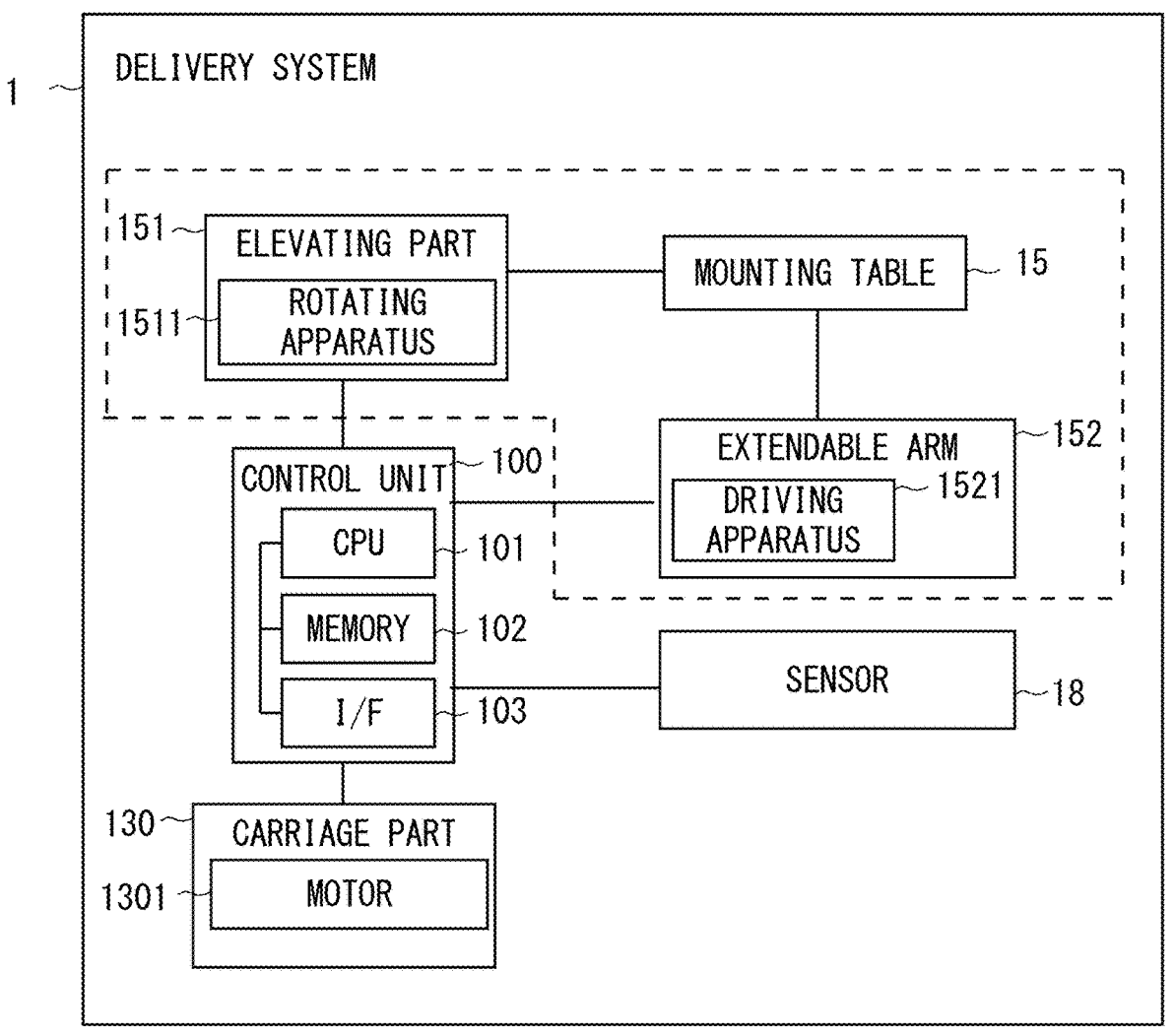
FIG. 2 is a block diagram for explaining functions of the delivery system according to the first embodiment.

FIG. 2 is a block diagram for explaining functions of the delivery system. The delivery system 1 includes the control unit 100. The control unit 100 may be provided in the delivery robot 10 or a management server. The control unit 100 receives a sensor signal from the sensor 18 connected thereto through a wired or wireless network and controls a normal operation of the delivery system that includes the delivery robot including the carriage part 130, an elevating part 151, an extendable arm 152, and the like. In some embodiments, the control unit 100 can control a door on the front surface of the storage shelf and an operation of a manipulator provided inside the door.

The carriage part 130 includes the base part 11, the driving wheels 13 rotatably provided in the base part 11, and motors 1301 that rotatably drive the respective driving wheels 13. Each of the motors 1301 rotates a respective one of the driving wheels 13 through a speed reducer or the like. Each of the motors 1301 rotates a respective one of the driving wheels 13 in accordance with a control signal sent from the control unit 100. Each of the motors 1301 rotates a respective one of the driving wheels 13 in accordance with a control signal sent from the control unit 100, thereby enabling the base part 11 to move to any position. Note that the above-described configuration of the carriage part 130 is merely an example, and the configuration of the carriage part 130 is not limited to this example. For example, the number of driving wheels of the carriage part 130 and the number of driven wheels of the carriage part 130 may be any number, and any configuration in which the base part 11 can be moved to any position can be used.

The mounting table 15 moves up and down by the elevating part 151 extending and contracting along the vertical axis. The elevating part 151 includes a rotating apparatus 1511. The extendable arm 152 is attached to the mounting table 15. The extendable arm 152 includes an arm body and a driving apparatus 1521. The driving apparatus 1521, which is attached to an internal part (not shown) of the mounting table 15, moves the arm body in the horizontal direction. The driving apparatus 1521 may further include a mechanism that rotates the arm body around the axis.

The sensor 18 is provided at any place in the delivery robot 10 including the carriage part 130 and the like. The sensor 18 is also referred to as a detection unit, and is, for example, a camera and can acquire captured images. The sensor 18 can detect the presence of passages, obstacles, people, storage shelves, and the like. The sensor 18 may include a movement detection sensor that detects movement of the carriage part 130 and a height detection sensor that detects a height of the mounting table 15. In some embodiments, the sensor 18 may be attached to another traveling robot instead of a delivery robot, or may be fixed to a building or the like. In this case, like in the above case, the sensor 18 may be connected to the control unit 100 of the delivery robot 10 through a wireless network.

The control unit 100 controls a normal operation of the delivery system that includes the delivery robot including the carriage part 130, the elevating part 151, the extendable arm 152, and the like. The control unit 100 can control the rotation of each of the driving wheels 13 and move the base part 11 to any position by transmitting a control signal to each of the motors 1301 of the carriage part 130. The control unit 100 can change a height position of the mounting table 15 by transmitting a control signal to the rotating apparatus 1511 of the elevating part 151. The control unit 100 can also change a horizontal position of the arm body by transmitting a control signal to the driving apparatus 1521 of the extendable arm 152.

The control unit 100 may control the movement of the base part 11 by performing well-known control such as feedback control and robust control based on information about the rotations of the driving wheels 13 detected by a rotation sensor(s) provided in the driving wheels 13. Further, the control unit 100 may control the operations of the carriage part 130, the elevating part 151, and the extendable arm 152 based on information such as information about a distance(s) detected by a distance sensor such as a camera or an ultrasonic sensor provided in the base part 11 and information about a map of the moving environment. The control unit 100 determines, based on the position of an obstacle detected by the camera and the position of a storage shelf, a stop position of the delivery robot and a stop direction of the delivery robot (i.e., a direction which the delivery robot is facing when it stops) relative to the storage shelf.

The control unit 100 includes, for example, a microcomputer including a control program executed by a Central Processing Unit (CPU) 101 that performs control processing, arithmetic processing, etc., a memory 102 including a Read Only Memory (ROM) that stores arithmetic programs etc., and an interface unit (I/F) 103 that inputs and outputs signals to and from the outside. The CPU 101, the memory 102, and the interface unit 103 are connected to one another through a data bus or the like.

Figure 3:
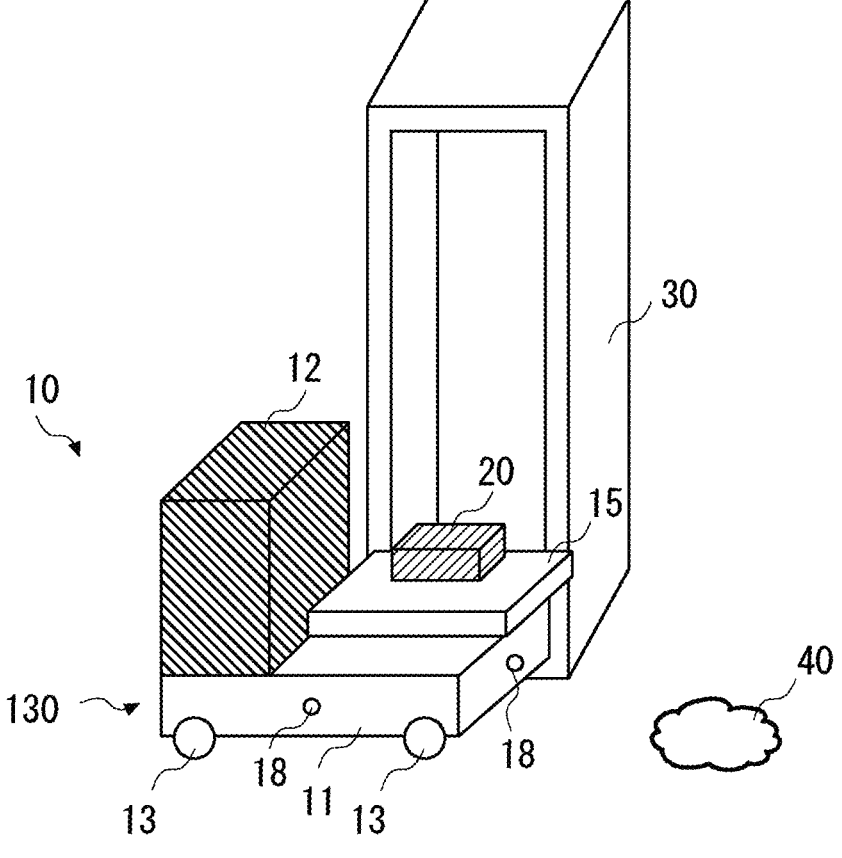
FIG. 3 is a perspective view for explaining a stop position of a delivery robot relative to an obstacle according to the first embodiment.

FIG. 3 is a perspective view for explaining a stop position of a delivery robot relative to an obstacle.

In FIGS. 1 and 3, an obstacle 40 is placed in a predetermined area near the storage shelf 30, for example, at the front left side of the storage shelf. The control unit 100 of the delivery robot 10 detects a position of the obstacle 40 and a position of the storage shelf 30 by the sensor 18. The control unit 100 determines a stop position and a stop direction of the delivery robot relative to the storage shelf as shown in FIG. 3 based on the detected position of the obstacle and the detected position of the storage shelf. Specifically, as shown in FIG. 3, the delivery robot 10 stops in front of the storage shelf 30 so that the storage part 12 of the delivery robot 10 is positioned so as to be located on the side thereof opposite to the side thereof near the obstacle 40 (the side thereof far from the obstacle) and the left side of the delivery robot 10 faces the storage shelf 30. Further, the delivery robot 10 can stop as close as possible to the storage shelf 30 so that a length that the extendable arm is extended is reduced as much as possible. Then, the control unit 100 of the delivery robot 10 controls the extendable arm 152 and the elevating part 151 based on the position of the storage shelf 30 transmitted by the sensor 18. As a result, the mounting table 15 can store the article 20 in the intended shelf of the storage shelf 30.

Figure 4:
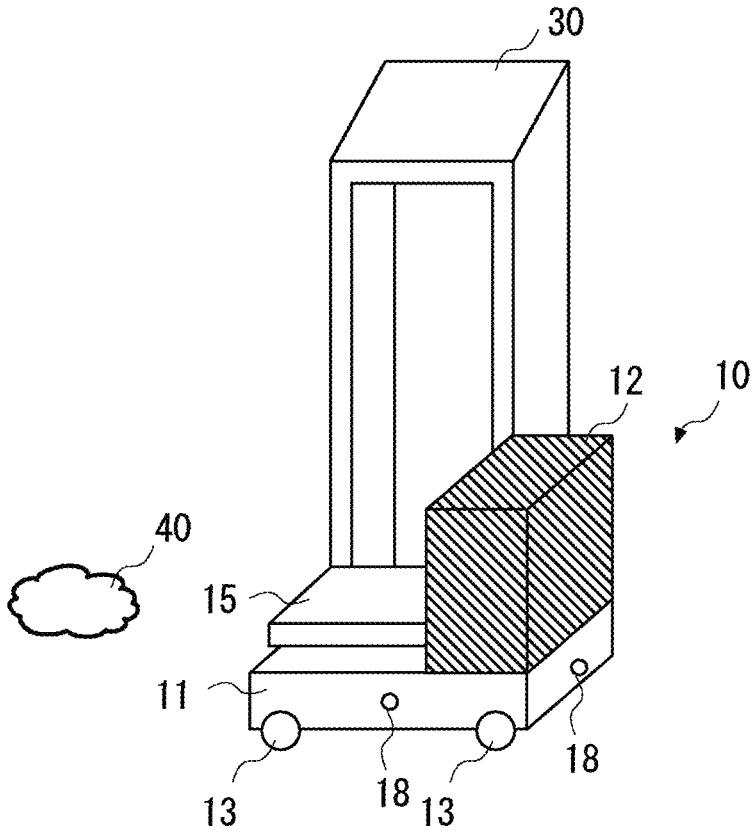
FIG. 4 is a perspective view for explaining a stop position of the delivery robot relative to an obstacle according to the first embodiment.

FIG. 4 is a perspective view for explaining a stop position of the delivery robot relative to an obstacle.

In FIG. 4, the obstacle 40 is placed in a predetermined area near the storage shelf 30, for example, at the front right side of the storage shelf. The control unit 100 of the delivery robot 10 detects a position of the obstacle 40 and a position of the storage shelf 30 by the sensor 18, and the control unit 100 determines a stop position and a stop direction of the delivery robot relative to the storage shelf as shown in FIG. 4 based on the detected position of the obstacle and the detected position of the storage shelf. Specifically, as shown in FIG. 4, the delivery robot 10 stops in front of the storage shelf 30 so that the storage part 12 of the delivery robot 10 is positioned so as to be located on the side thereof opposite to the side thereof near the obstacle 40 (the side thereof far from the obstacle) and the right side of the delivery robot 10 faces the storage shelf 30. Further, the delivery robot 10 can stop as close as possible to the storage shelf 30 so that a length that the extendable arm is extended is reduced as much as possible. Then, the control unit 100 of the delivery robot 10 controls the extendable arm 152 and the elevating part 151 based on the position of the storage shelf 30 transmitted by the sensor 18. As a result, the mounting table 15 can store the article 20 in the intended shelf of the storage shelf 30.

Figure 5:
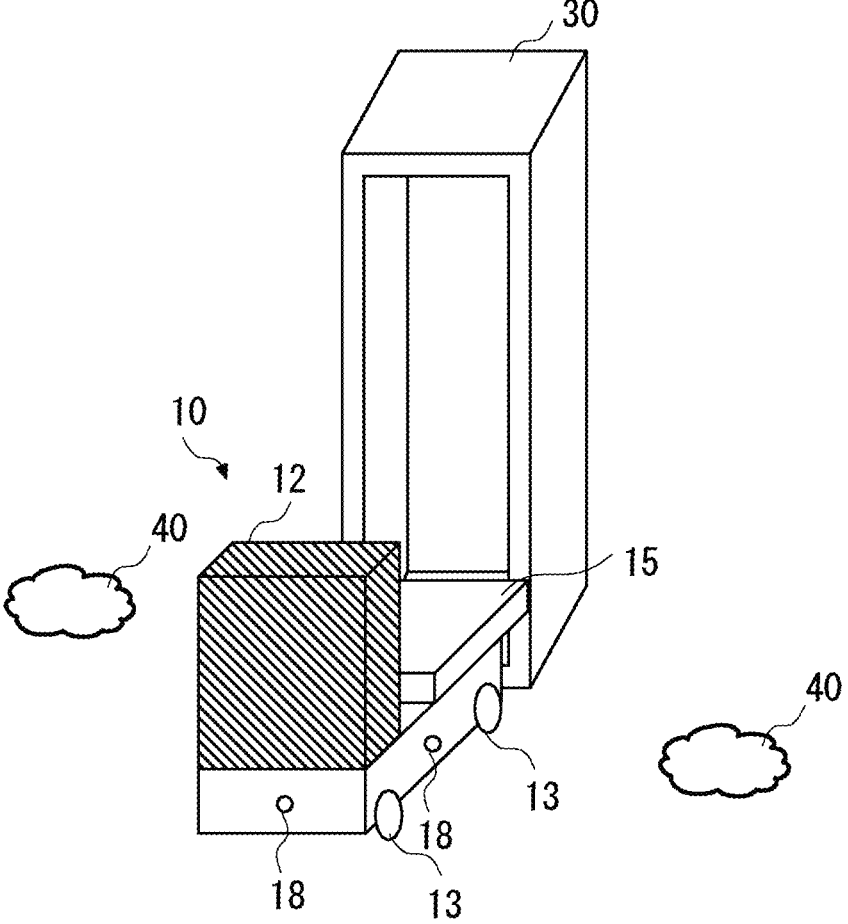
FIG. 5 is a perspective view for explaining a stop position of the delivery robot relative to an obstacle according to the first embodiment.

FIG. 5 is a perspective view for explaining a stop position of the delivery robot relative to an obstacle.

In FIG. 5, two obstacles 40 are respectively placed at the front left side and the front right side of the storage shelf 30. The control unit 100 of the delivery robot 10 detects a position of each of the two obstacles 40 and a position of the storage shelf 30 by the sensor 18, and the control unit 100 determines a stop position and a stop direction of the delivery robot relative to the storage shelf as shown in FIG. 5 based on the detected positions of the obstacles and the detected position of the storage shelf. Specifically, as shown in FIG. 5, the delivery robot stops in front of the storage shelf 30 between the two obstacles 40 so that the storage part 12 is positioned so as to be located far from the storage shelf 30 and the front side of the delivery robot 10 faces the storage shelf 30. Further, the delivery robot 10 can stop as close as possible to the storage shelf 30 so that a length that the extendable arm is extended is reduced as much as possible. Then, the control unit 100 of the delivery robot 10 controls the extendable arm 152 and the elevating part 151 based on the position of the storage shelf 30 transmitted by the sensor 18. As a result, the mounting table 15 can store the article 20 in the intended shelf of the storage shelf 30. However, since there is a risk that the passage in front of the storage shelf might be blocked when the delivery robot stops in front of the storage shelf so that the front side of the delivery robot faces the storage shelf as shown in FIG. 5, the control unit preferentially selects to stop the delivery robot in front of the storage shelf so that the left side of the delivery robot faces the storage shelf as shown in FIG. 3 or the right side of the delivery robot faces the storage shelf as shown in FIG. 4.

Figure 6:
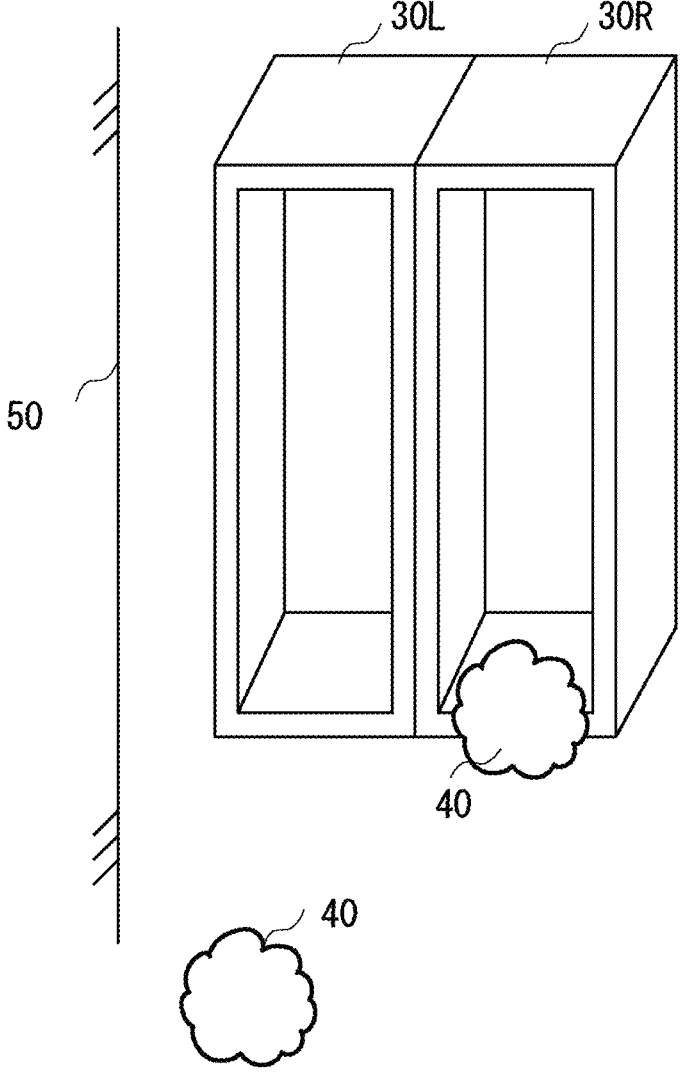
FIG. 6 is a perspective view for explaining a position of an obstacle relative to a storage shelf where the delivery robot can deliver an article to the storage shelf according to the first embodiment.

FIG. 6 is a perspective view for explaining a position of an obstacle relative to a storage shelf where the delivery robot can deliver an article to the storage shelf.

As shown in FIG. 6, two storage shelves 30 are arranged side by side next to a wall 50 of a building or the like. The obstacle 40 is disposed so that it protrudes forward from the inside of the right storage shelf 30. Therefore, the delivery robot 10 cannot stop in a substantially parallel manner in front of the left storage shelf 30 so that the left side of the delivery robot faces the storage shelf as shown in FIG. 3 or the right side of the delivery robot faces the storage shelf as shown in FIG. 4. Further, another obstacle 40 is disposed slightly in front of the left storage shelf 30. Therefore, the delivery robot 10 cannot stop in a substantially parallel manner in front of the left storage shelf 30 so that the front side of the delivery robot 10 faces the storage shelf 30 as shown in FIG. 5. However, the control unit 100 of the delivery robot 10 may detect the positions of the two obstacles, the position of the wall 50, and the positions of the two storage shelves 30 from the captured image, and may determine that it is possible to deliver an article by stopping the delivery robot 10 so that it is positioned diagonally in front of the left storage shelf 30 as shown in FIG. 7 (see FIG. 7).

Figure 7:
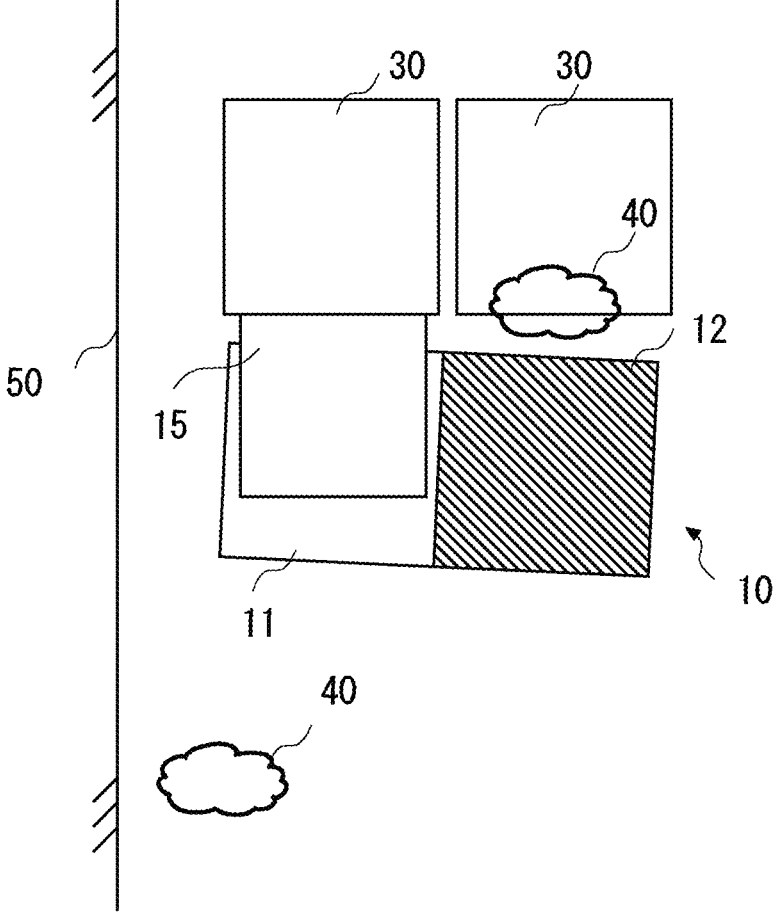
FIG. 7 is a top view for explaining a position of the delivery robot relative to an obstacle where the delivery robot can deliver an article to a storage shelf according to the first embodiment.

FIG. 7 is a top view for explaining a position of the delivery robot relative to an obstacle where the delivery robot can deliver an article to the storage shelf.

The delivery robot 10 can stop so that the base part 11 faces the left storage shelf 30 and the delivery robot 10 is positioned diagonally to the front surface of the left storage shelf 30 while avoiding the two obstacles 40. Further, the delivery robot 10 makes the mounting table 15, which is configured so that it can be rotated about the vertical axis, face the storage shelf 30, or the delivery robot 10 makes the mounting table 15 face the storage shelf 30 and moves it in the horizontal direction, whereby the delivery robot 10 can store an article in the storage shelf.

In some embodiments, when a wide storage shelf formed by integrating two storage shelves with each other such as those shown in FIG. 6 has a plurality of possible storage spaces (e.g., a right storage shelf 30R and a left storage shelf 30L), the control unit 100 can determine a position corresponding to the storage space where no obstacle is present (in FIG. 6, the left storage shelf 30L) as a stop position of the delivery robot.

In another embodiment, when a storage shelf formed by integrating two storage shelves with each other such as those shown in FIG. 6 has a plurality of possible storage spaces (e.g., the right storage shelf 30R and the left storage shelf 30L), the sensor 18 that detects whether or not an article is stored in a storage place may be provided in each storage shelf. By this configuration, when the sensor 18 detects that the article is stored in a storage place where no obstacle is present (the left storage shelf 30L in this example), the control unit 100 takes predetermined measures to move the article to a storage place where the obstacle is present (the right storage shelf 30R in this example). For example, predetermined measures may include sending a request (e.g., an email, a message) to a communication terminal of a specific person (e.g., a caretaker, a resident) so that an article stored in a storage place where no obstacle is present (e.g., the left storage shelf 30L) to a storage place where an obstacle is present (e.g., the right storage shelf 30R). Alternatively, a manipulator (not shown) provided inside the storage shelf 30 moves an article to a storage place where an obstacle is present (e.g., the right storage shelf 30R). For example, each of the right storage shelf 30R and the left storage shelf 30L includes a manipulator. The manipulator provided in the right storage shelf 30R can move an article to the left storage shelf 30L through a passage (not shown) in the storage shelf.

Figure 8:
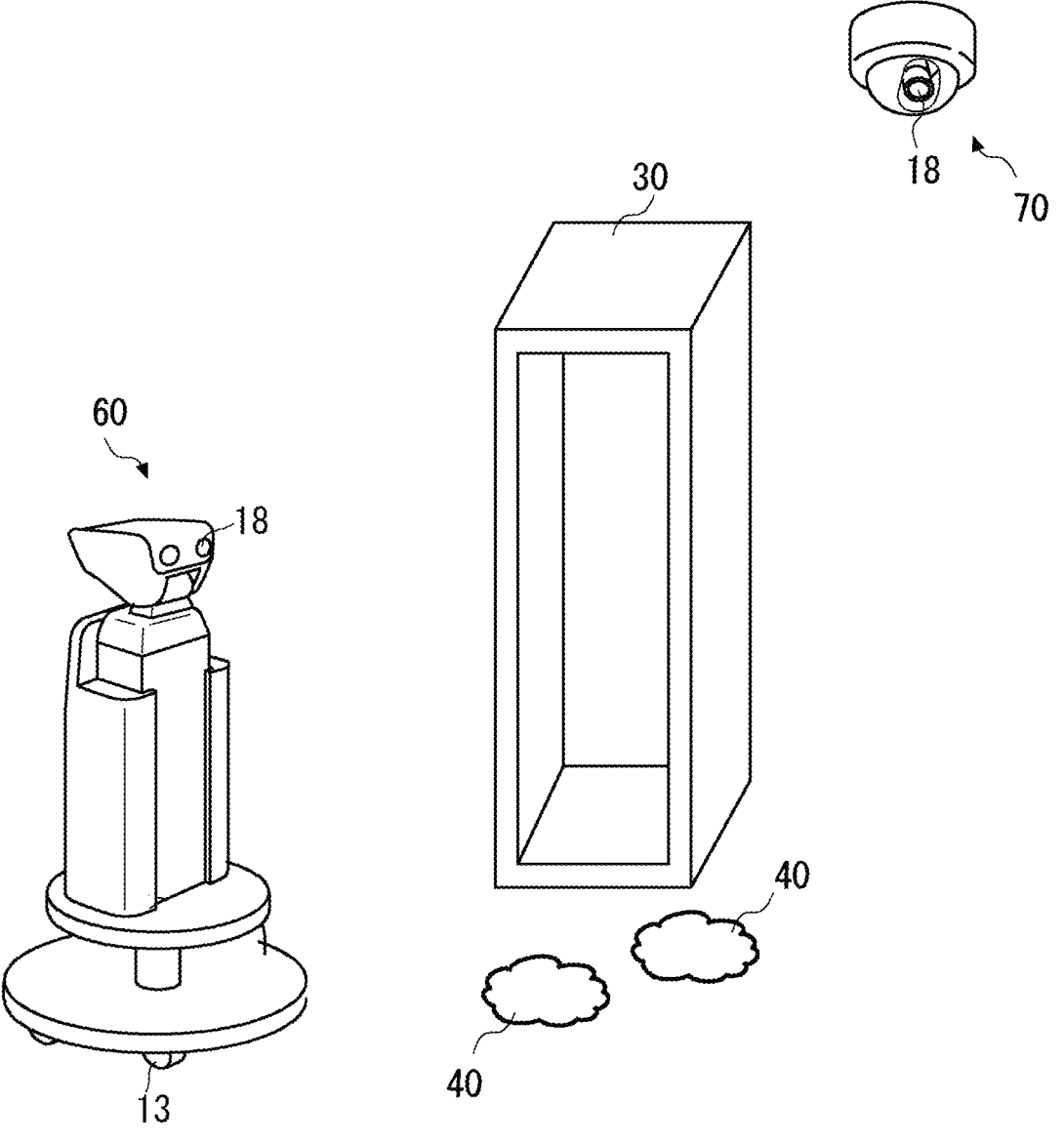
FIG. 8 is a perspective view for explaining a position of an obstacle relative to a storage shelf where the delivery robot cannot deliver an article to the storage shelf according to the first embodiment.

FIG. 8 is a perspective view for explaining a position of an obstacle relative to a storage shelf where the delivery robot cannot deliver an article to the storage shelf.

As shown in FIG. 8, two obstacles 40 are disposed in front of the storage shelf 30. The control unit 100 of the delivery robot 10 detects a position of each of the two obstacles 40 and a position of the storage shelf 30 by the sensor 18 of the traveling robot 60 or the fixed monitoring camera 70 connected through a wireless or a wired network. However, the control unit 100 may determine that the delivery robot 10 cannot deliver an article to the storage shelf 30 based on the position of each of the obstacles 40 and the position of the storage shelf 30 detected by the sensor 18, the maximum length of the extendable arm of the delivery robot 10 (not shown in FIG. 8), the size of the delivery robot and the range of movement thereof, and the like. In this case, the delivery robot stops delivering an article to the storage shelf 30 and moves in order to deliver another article.

By the delivery system according to the first embodiment described above, whether or not an article can be delivered to the storage shelf may be determined based on the position of the obstacle and the position of the storage shelf detected by the sensor, the maximum length of the extendable arm of the delivery robot, the size of the delivery robot and the range of movement thereof, and the like. When the delivery system determines that an article can be delivered to the storage shelf, it may determine a stop position and a stop direction of the delivery robot relative to the storage shelf.

Second Embodiment

Figure 9:
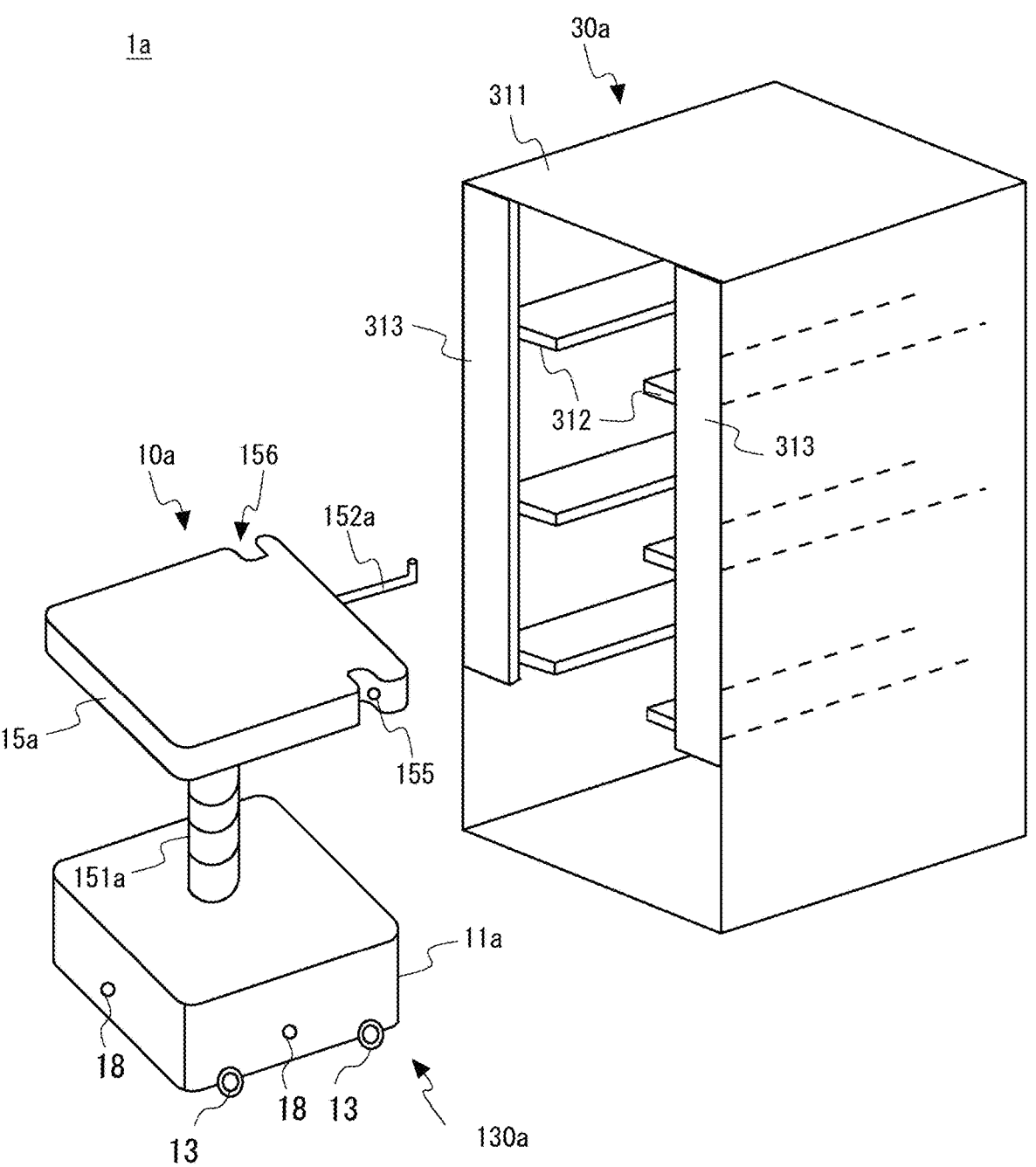
FIG. 9 is a perspective view for explaining a delivery system according to a second embodiment.

FIG. 9 is a diagram for explaining an outline of a delivery system 1a. The delivery system 1a includes a storage shelf 30a and a delivery robot 10a. The delivery robot 10 conveys an article and stores it in the storage shelf 30. The delivery robot 10a takes an article out of the storage shelf 30a and conveys the article taken out. Although not shown in FIG. 9, the delivery robot 10a may include the storage part 12 as shown in FIG. 1. Further, the storage shelf 30a and the delivery robot 10a according to the second embodiment include an engagement mechanism described later so that an article can be put into a storage shelf and taken out of the storage shelf safely. In FIG. 9, descriptions of the same components as those in the first embodiment will be omitted as appropriate.

The storage shelf 30a houses an article not shown. Examples of the article may include a returnable box. The storage shelf 30a includes a housing 311, support members 312, and guide rails 313. The support member 312 supports an article housed in the storage shelf 30a.

The guide rail 313 engages a groove 156 provided in a mounting table 15a of the delivery robot 10a. The guide rail 313 extends in the vertical direction. The guide rail 313 may be a plate-like member provided so as to be parallel to a front surface of the storage shelf 30a. The plate-like member protrudes inwardly from the housing 311. The guide rails 313 may be provided on each of the left and right sides of the housing 311, or may instead be provided on one of the left and right sides thereof.

The delivery robot 10a includes the mounting table 15a, a carriage part 130a, an elevating part 151a, an extendable arm 152a, and an engagement detection sensor 155. The mounting table 15a is a table on which an article can be placed and is also referred to as a top plate. The groove 156 extending in the vertical direction is provided on a side surface of the mounting table 15a. When the mounting table 15a is moved up from below by an operation of the elevating part 151a, the groove 156 is engaged with the guide rail 313 of the storage shelf 30a. The groove 156 may be provided on each of the right-side surface and the left-side surface of the mounting table 15a.

The delivery robot 10a is moved in the horizontal direction by the movable carriage part 130a. The elevating part 151a is provided on the carriage part 130a. The elevating part 151a moves the mounting table 15a up and down. The extendable arm 152a extends and contracts in the horizontal direction. The extendable arm 152a takes an article out of the storage shelf 30a and places the article on the mounting table 15a, and stores the article on the mounting table 15a in the storage shelf 30.

The engagement detection sensor 155 is provided in the groove 156. The engagement detection sensor 155 detects that the guide rail 313 is engaged with the groove 156. When the guide rail 313 is engaged with the groove 156, the guide rail 313 is engaged with the mounting table 15a. The engagement detection sensor 155 is, for example, a photo interrupter or a photo reflector. In this case, the engagement detection sensor 155 includes a light emitting unit and a light receiving unit. When the light from the light emitting unit is blocked by the guide rail 313, the engagement detection sensor 155 may detect that the guide rail 313 is engaged with the mounting table 15. When the light from the light emitting unit is reflected by the guide rail 313, the engagement detection sensor 155 may detect that the guide rail 313 is engaged with the mounting table 15a. Note that the engagement detection sensor 155 may be a sensor (e.g., a contact sensor, a magnetic sensor) that detects a force received from the guide rail 313.

Figure 10:
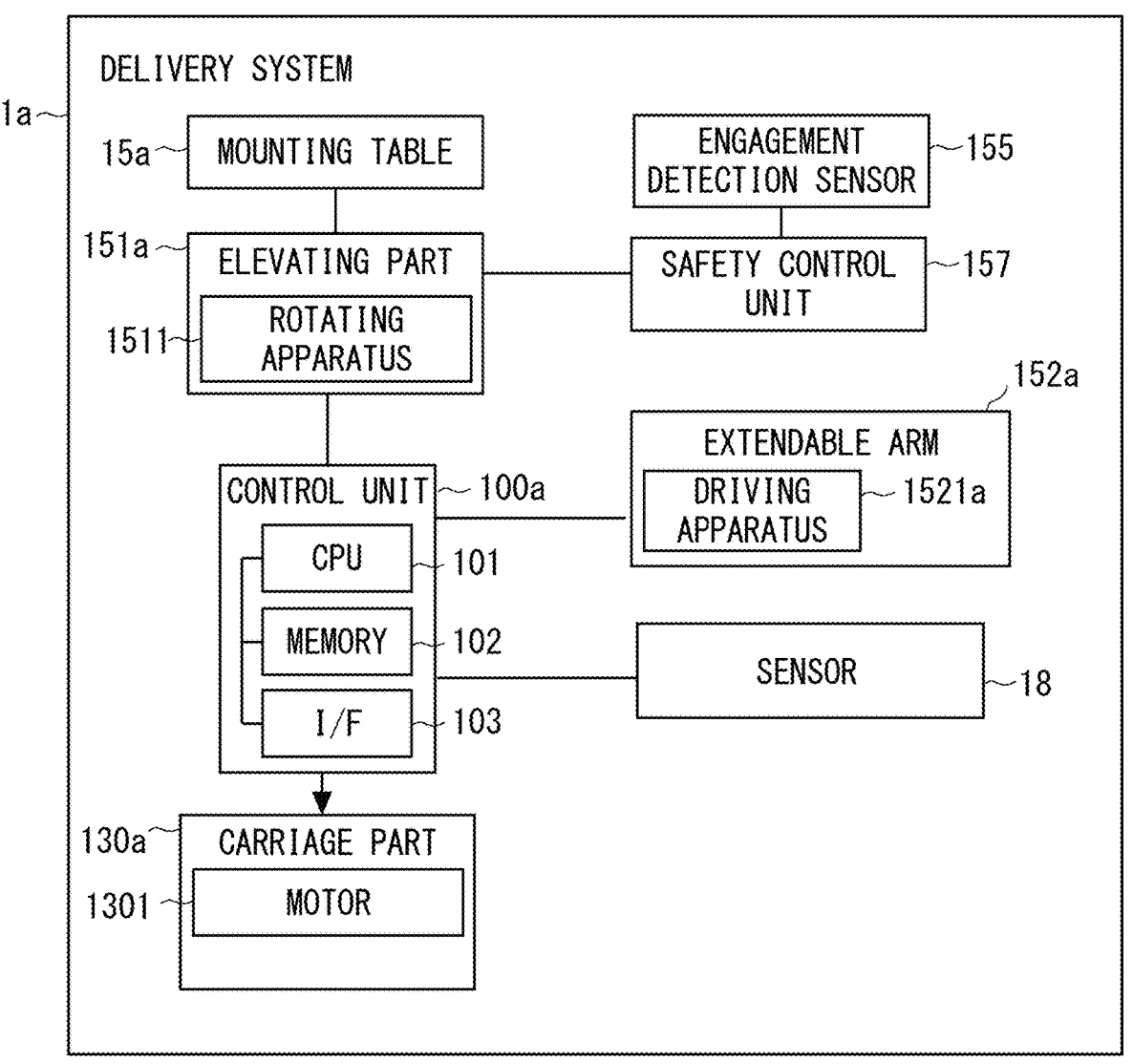
FIG. 10 is a block diagram for explaining functions of a delivery system according to the second embodiment.

As shown in FIG. 10, the delivery robot 10a includes a control unit 100a and a safety control unit 157. The control unit 100a controls normal operations of the carriage part 130a, the elevating part 151a, and the extendable arm 152a. The safety control unit 157 stops (e.g., urgently stops) the operation of the elevating part 151a based on a result of detection by the engagement detection sensor 155. The safety control unit 157 may also stop the operations of the carriage part 130a and the extendable arm 152a.

The groove 156 extending in the vertical direction is provided on the side surface of the mounting table 15a. The groove 156 is provided so as to extend from the lower surface of the mounting table 15a to the upper surface thereof. The groove 156 is engageable with the guide rail 313.

The carriage part 130a includes a base part 11a, a pair of right and left driving wheels 13 and a pair of front and rear driven wheels 13 rotatably disposed in the base part 11a, and a pair of motors 1301 that rotationally drive the respective driving wheels 13. Each of the motors 1301 rotates a respective one of the driving wheels 13 through a speed reducer or the like. Each of the motors 1301 rotates a respective one of the driving wheels 13 in accordance with a control signal sent from the control unit 100a. Each of the motors 1301 rotates a respective one of the driving wheels 13 in accordance with a control signal sent from the control unit 100a, thereby enabling the base part 11a to move to any position.

The mounting table 15a moves up and down by the elevating part 151a extending and contracting along the vertical axis. The elevating part 151a may be formed as a telescopic expanding/contracting mechanism that extends and contracts in the vertical direction. The extendable arm 152a is attached to the mounting table 15a. The extendable arm 152a includes an arm body and a driving apparatus 1521a. The driving apparatus 1521a, which is attached to a guide rail mechanism (not shown) in the mounting table 15a, moves the arm body in the horizontal direction. The driving apparatus 1521a may further include a mechanism that rotates the arm body around the axis.

The engagement detection sensor 155 is provided in the groove 156. The engagement detection sensor 155 may be provided on each of the left and right sides of the mounting table 15a. The engagement detection sensor 155 can detect that the groove 156 is engaged with the guide rail 313. The delivery robot 10a may further include a movement detection sensor that detects movement of the carriage part 130a and a height detection sensor that detects a height of the mounting table 15a.

The control unit 100a controls normal operations of the carriage part 130a, the elevating part 151a, and the extendable arm 152a. The control unit 100a can control the rotation of each of the driving wheels 13 and move the base part 11a to any position by transmitting a control signal to each of the motors 1301 of the carriage part 130a. The control unit 100a can control a height position of the mounting table 15a by transmitting a control signal to the rotating apparatus 1511 of the elevating part 151a. The control unit 100a can also control a horizontal position of the arm body by transmitting a control signal to the driving apparatus 1521a of the extendable arm 152a.

The control unit 100a may control the movement of the base part 11a by performing well-known control such as feedback control and robust control based on information about the rotations of the driving wheels 13 detected by a rotation sensor(s) provided in the driving wheels 13. Further, the control unit 100a may control the operations of the carriage part 130a, the elevating part 151a, and the extendable arm 152a based on information such as information about a distance(s) detected by a distance sensor such as a camera or an ultrasonic sensor provided in the base part 11a and information about a map of the moving environment.

The control unit 100a is mainly composed of, for example, hardware such as a microcomputer including the Central Processing Unit (CPU) 101 that performs control processing, arithmetic processing, and the like, the memory 102 including Read Only Memory (ROM) that stores a control program, an arithmetic program, and the like executed by the CPU 101, and the interface unit (I/F) 103 that inputs and outputs signals from and to the outside. The CPU 101, the memory 102, and the interface unit 103 are connected to one another through a data bus or the like.

The safety control unit 157 acquires a result of detection by the engagement detection sensor 155. The safety control unit 157 may further acquire a result of detection by a sensor other than the engagement detection sensor 155. The safety control unit 157 stops the operation of the elevating part 151a when a first condition including that the guide rail 313 is not engaged with the mounting table 15a is satisfied.

Like the control unit 100a, the safety control unit 157 may include a processor, a memory, and the like. The safety control unit 157 may be a Programmable Logic Controller (PLC). The control unit 100a may include the safety control unit 157.

The first condition may further include that a height of the mounting table 15*a* is greater than or equal to a predetermined height h1. When the safety control unit 157 stops the operation of the elevating part 151*a*, the safety control unit 157 may stop the supply of power to the elevating part 151*a*.

Note that when the guide rail 313 is engaged with the mounting table 15*a*, it is not necessary to extend the elevating part 151*a* in some cases. For example, when the mounting table 15*a* is configured so that it can be tilted, the guide rail 313 can, upon the mounting table 15*a* being tilted, engage therewith. Further, for example, when the guide rail 313 is provided on one side of the storage shelf 30, the guide rail 313 can be engaged with the mounting table 15*a* by the delivery robot 10*a* moving in a direction parallel to the front surface of the storage shelf 30*a*. In such a case, the first condition may not include a condition regarding the height of the mounting table 15*a*.

As described above, the delivery system according to the second embodiment can detect whether or not the mounting table is engaged with the storage shelf, thereby safely storing an article. Therefore, in the second embodiment, the control unit 100*a* determines a stop position of the delivery robot relative to the storage shelf so that the mounting table can be engaged with the storage shelf.

For example, the control unit 100*a* determines, based on the position of the detected obstacle, a stop position of the delivery robot relative to the storage shelf and a stop direction in which the delivery robot stops in front of the storage shelf so that either a left side or a right side of the delivery robot faces the storage shelf (see FIGS. 3 and 4), the stop position and the stop direction enabling the groove formed in the mounting table of the delivery robot to be engaged with the guide rail of the storage shelf.

Further, the control unit 100*a* determines, based on the position of the detected obstacle, a stop position of the delivery robot relative to the storage shelf and a stop direction in which the delivery robot stops in front of the storage shelf so that the front side of the delivery robot faces the storage shelf (see FIG. 5), the stop position and the stop direction enabling the groove formed in the mounting table of the delivery robot to be engaged with the guide rail of the storage shelf. However, since there is a risk that the passage of an apartment building etc. might be blocked when the delivery robot stops in front of the storage shelf so that the front side of the delivery robot faces the storage shelf, the control unit 100 may preferentially select to stop the delivery robot so that either the left side or the right side of the delivery robot faces the storage shelf (see FIGS. 3 and 4).

In another embodiment, the control unit 100 may determine, based on the detected position of the obstacle, a stop position of the delivery robot relative to the storage shelf and a stop direction relative to the storage shelf in which the groove formed in the mounting table of the delivery robot cannot be engaged with the guide rail of the storage shelf and an article can be stored in the storage shelf. As described above, since the mounting table 15*a* of the delivery robot is configured to be rotatable 360 degrees, the delivery robot may stop so that it is positioned diagonally in front of the storage shelf and store an article in the storage shelf by means of the extendable arm or the like. In this case, the extendable arm is extended longer than in the case where the groove can be engaged with the guide rail.

Although the delivery system has been described in the above embodiments, the present disclosure is also applicable to a delivery method using the components of the delivery system.

The above-described program includes instructions (or software codes) that, when loaded into a computer, cause the computer to perform one or more of the functions described in the example embodiments. The program may be stored in a non-transitory computer readable medium or a tangible storage medium. By way of example, and not a limitation, non-transitory computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (Registered Trademark) disc or other types of optical disc storage, a magnetic cassette, a magnetic tape, and a magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

Note that the present disclosure is not limited to the above-described embodiments and may be changed as appropriate without departing from the scope and spirit of the present disclosure. A plurality of examples described above can also be executed by combining them with one another as appropriate.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A delivery system, comprising:
    a storage shelf;
    a delivery robot capable of moving to the storage shelf and delivering an article to the storage shelf;
    a detection unit configured to detect an obstacle present near the storage shelf; and
    a control unit configured to control an operation of the delivery robot,
    wherein the control unit is configured to, when the detection unit detects an obstacle present in a predetermined area near the storage shelf and the control unit determines that the delivery robot is able to deliver an article to the storage shelf, determine a stop position and a stop direction of the delivery robot relative to the storage shelf based on a combination of all of
    (a) a position of the detected obstacle,
    (b) a position of the storage shelf,
    (c) a maximum length of an extendable arm of the delivery robot,
    (d) a size of the delivery robot, and
    (e) a range of movement of the delivery robot, and
    then stop the delivery robot at the determined stop position in the determined stop direction to store the article in the storage shelf.

2. The delivery system according to claim 1, wherein
    the delivery robot comprises a carriage part, a mounting table provided on the carriage part and configured so as to be able to move up and down while an article is placed thereon, a groove formed in the mounting table, and a storage unit provided on the carriage part and capable of storing a plurality of articles,
    the storage shelf comprises a guide rail capable of being engaged with the groove formed in the mounting table, and the control unit is configured to determine a stop position of the delivery robot relative to the storage shelf and a stop direction in which the delivery robot stops in front of the storage shelf so that one of a left side and a right side of the delivery robot faces the storage shelf based on the position of the detected obstacle and the position of the storage shelf, the stop position and the stop direction enabling the groove formed in the mounting table of the delivery robot to be engaged with the guide rail of the storage shelf, and then stop the delivery robot at the determined stop position in the determined stop direction to store the article in the storage shelf.

3. The delivery system according to claim 2, wherein the control unit is configured to, when the delivery robot is unable to determine the stop direction in which the delivery robot stops in front of the storage shelf so that one of the left side and the right side of the delivery robot faces the storage shelf, determine a stop position of the delivery robot relative to the storage shelf and a stop direction in which the delivery robot stops in front of the storage shelf so that a front side of the delivery robot faces the storage shelf based on the position of the detected obstacle and the position of the storage shelf, the stop position and the stop direction enabling the groove formed in the mounting table of the delivery robot to be engaged with the guide rail of the storage shelf, and then stop the delivery robot at the determined stop position in the determined stop direction to store the article in the storage shelf.

4. The delivery system according to claim 3, wherein the control unit is configured to, when the delivery robot is unable to determine the stop direction in which the delivery robot stops in front of the storage shelf so that one of the left side and the right side of the delivery robot faces the storage shelf and the stop direction in which the delivery robot stops in front of the storage shelf so that the front side of the delivery robot faces the storage shelf, determine a stop position of the delivery robot relative to the storage shelf and a stop direction relative to the storage shelf in which the groove formed in the mounting table of the delivery robot is unable to be engaged with the guide rail of the storage shelf and an article is able to be stored in the storage shelf based on the position of the detected obstacle and the position of the storage shelf, and then stop the delivery robot at the determined stop position in the determined stop direction to store the article in the storage shelf.

5. The delivery system according to claim 1, wherein the control unit is configured to, when the storage shelf has a plurality of possible storage spaces, determine a position corresponding to the storage space where the detected obstacle is not present as a stop position, and then stop the delivery robot at the determined stop position in the determined stop direction to store the article in the storage shelf.

6. The delivery system according to claim 1, wherein the control unit is configured to, when the storage shelf has a plurality of possible storage spaces and an article is stored in the storage place where the detected obstacle is not present, take predetermined measures to move the article to the storage place where the obstacle is present.

7. The delivery system according to claim 6, wherein the predetermined measures include sending a request to a specific person to move the article to the storage place where the obstacle is present, or causing a manipulator provided in the storage shelf to move the article to the storage place where the obstacle is present.

8. A delivery method comprising, when a detection unit detects an obstacle present in a predetermined area near a storage shelf and it is determined that a delivery robot is able to deliver an article to the storage shelf, determining a stop position and a stop direction of the delivery robot relative to the storage shelf based on a combination of all of
(a) a position of the detected obstacle,
(b) a position of the storage shelf,
(c) a maximum length of an extendable arm of the delivery robot,
(d) a size of the delivery robot, and
(e) a range of movement of the delivery robot, and
then stopping the delivery robot at the determined stop position in the determined stop direction to store the article in the storage shelf.

9. A non-transitory computer readable medium storing a program for causing a computer to, when a detection unit detects an obstacle present in a predetermined area near a storage shelf and it is determined that a delivery robot is able to deliver an article to the storage shelf, determine a stop position and a stop direction of the delivery robot relative to the storage shelf based on a combination of all of
(a) a position of the detected obstacle,
(b) a position of the storage shelf,
(c) a maximum length of an extendable arm of the delivery robot,
(d) a size of the delivery robot, and
(e) a range of movement of the delivery robot, and
then stop the delivery robot at the determined stop position in the determined stop direction to store the article in the storage shelf.

10. The delivery system according to claim 1, wherein the control unit is configured to preferentially determine the stop position and the stop direction of the delivery robot relative to the storage shelf in a following order, a first preference where the control unit determines the stop position of the delivery robot so that one of a left side and a right side of the delivery robot faces the storage shelf, then the control unit stops the delivery robot at the determined stop position in the determined stop direction to store the article in the storage shelf, a second preference where the control unit determines that the delivery robot is unable to determine the stop direction in which the delivery robot stops in front of the storage shelf so that one of the left side and the right side of the delivery robot faces the storage shelf, then the control unit stops the delivery robot in front of the storage shelf so that a front side of the delivery robot faces the storage shelf, and a third preference where the control unit determines that the delivery robot is unable to determine the stop direction in which the delivery robot stops in front of the storage shelf so that one of the left side and the right side of the delivery robot faces the storage shelf and the stop direction in which the delivery robot stops in front of the storage shelf so that the front side of the delivery robot faces the storage shelf, then the control unit stops the delivery robot at an angled position with respect to the storage shelf so that an article is able to be stored in the storage shelf, and a fourth preference where the control unit determines that all of the first, second and third preferences are unavailable, then the control unit controls the delivery robot to stop delivering the article to the storage shelf and move in order to deliver another article.

11. The delivery system according to claim 1, wherein the system further comprises a traveling robot including a sensor, the traveling robot communicating monitoring information to the delivery robot through a wireless network.

* * * * *